United States Patent [19]
Hofmann et al.
[11] 4,362,936
[45] Dec. 7, 1982

[54] APPARATUS FOR MONITORING AND/OR CONTROLLING PLASMA PROCESSES

[75] Inventors: Dieter Hofmann; Reiner Wechsung, both of Cologne, Fed. Rep. of Germany
[73] Assignee: Leybold-Heraeus GmbH, Cologne, Fed. Rep. of Germany

[21] Appl. No.: 210,596
[22] Filed: Nov. 26, 1980
[30] Foreign Application Priority Data
Nov. 26, 1979 [DE] Fed. Rep. of Germany ....... 2947542
[51] Int. Cl.[3] ............ B01D 59/44
[52] U.S. Cl. ............ 250/292; 250/423 R
[58] Field of Search ............ 250/281, 282, 283, 288, 250/292, 423 R

[56] References Cited

U.S. PATENT DOCUMENTS

| | | | |
|---|---|---|---|
| 3,096,438 | 7/1963 | Neidigh | 250/286 |
| 3,676,672 | 7/1972 | Meckel et al. | 250/423 |
| 3,859,226 | 1/1975 | Schillalies | 250/292 |
| 3,861,878 | 1/1975 | De Corpo et al. | 422/50 |

OTHER PUBLICATIONS

Daley et al., IBM Technical Disclosure Bulletin, Apr. 1978, vol. 20, No. 11B p. 4802.
Coburn et al, Solid State Technology, Apr. 1979, vol. 22, No. 4, pp. 117–124.
Flamm, Solid State Technology, Apr. 1979, vol. 22, No. 4, pp. 109–116.
Asahi et al, Japanese Journal of Applied Physics, Mar. 1979, vol. 18, No. 3, pp. 565–573.
Rowe, International Journal of Mass Spectrometry and Ion Physics, 16 (1975) pp. 209–223.
Gray, Analytical Chemistry, Mar. 1975, vol. 47, No. 3, pp. 600–601.
Hayhurst, IEEE Transactions on Plasma Science, Sep. 1974, vol. PS-2, pp. 115–121.
Kinsman et al, International Journal of Mass Spectrometry and Ion Physics 4 (1970), pp. 393–400.
Mullen et al, The Review of Scientific Instruments, Dec. 1970, vol. 41, No. 12, pp. 1746–1753.

*Primary Examiner*—Bruce C. Anderson
*Attorney, Agent, or Firm*—Spencer & Kaye

[57] ABSTRACT

Apparatus for monitoring a plasma process in which a plasma is formed to occupy a specified region, which apparatus is composed of: a mass spectrometer system including a mass analyzer having an ion inlet and an ion outlet and an ion detector disposed in operative association with the ion outlet; an output device connected to the detector for providing an output signal representative of the mass spectrum of ions observed by the mass spectrometer system; and an ion-optical system having an inlet opening located in the vicinity of the specified region and disposed for extracting ions from the plasma and focussing the ions thus extracted onto the ion inlet of the analyzer, whereby the output signal produced by the output device is representative of the mass spectrum of ions in the plasma.

4 Claims, 1 Drawing Figure

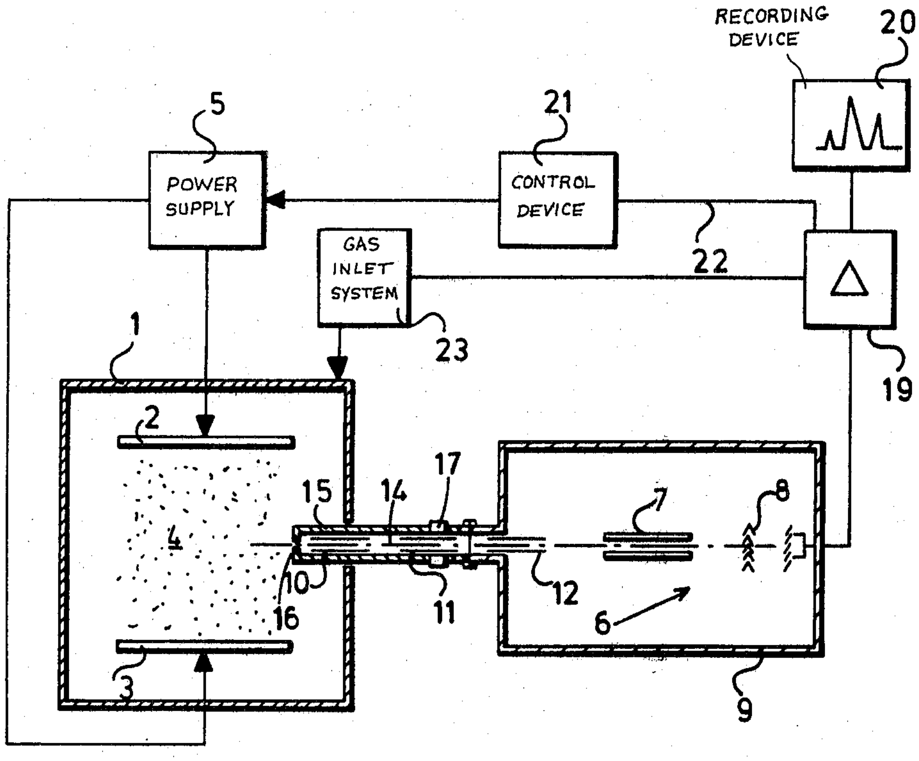
RECORDING DEVICE
20
21
5
POWER SUPPLY
CONTROL DEVICE
GAS INLET SYSTEM
22
23
19
1
2
4
15
14
17
7
8
10
16
11
12
6
3
9

APPARATUS FOR MONITORING AND/OR CONTROLLING PLASMA PROCESSES

BACKGROUND OF THE INVENTION

The present invention relates to apparatus for monitoring and/or controlling plasma processes.

Plasma processes are used on an industrial scale in many technical fields. For example, by means of plasmas it is possible to deposit, atomize or sputter materials, e.g. in sputtering processes, to etch materials, e.g. in ionic etching and plasma etching, and to apply coatings, e.g. in plasma chemical-vapor deposition. A further special application is plasma polymerization. A considerable problem arising when performing plasma processes is their monitoring and control.

It is known to use optical emission spectroscopy for monitoring such plasma processes. The parameter monitored is the light emission of atoms or molecules in the plasma which are stimulated to produce light. It is generally not possible to obtain quantitative results in optical emission spectroscopy.

SUMMARY OF THE INVENTION

It is an object of the present invention to enable such plasma processes to be monitored and/or controlled in a simple manner and on both qualitative and quantitative bases.

The above and other objects are achieved, according to the invention, by apparatus for monitoring a plasma process in which a plasma is formed to occupy a specified region, which apparatus is composed of:

a mass spectrometer including a mass analyzer having an ion inlet and an ion outlet and an ion detector disposed in operative association with the ion outlet;

an output device connected to the detector for providing an output signal representative of the mass spectrum of ions observed by the mass spectrometer; and an ion-optical system having an inlet opening located in the vicinity of the specified region and disposed for extracting ions from the plasma and focussing the ions thus extracted onto the ion inlet of the analyzer, whereby the output signal produced by the output device is representative of the mass spectrum of ions in the plasma.

Apparatus in accordance with the invention permits sensitive qualitative and quantitative detection of all of the ionized particles present in the plasma to be achieved in a simple manner. A plasma process, such as a cathodic atomization process or a process combined with a plasma, e.g. a vapor-deposition process, can therefore be controlled in situ. Analyses can be carried out by the programmed removal of deposited material. Depth-analysis of samples is also possible. Furthermore, the composition of residual gas in the discharge chamber can be continuously observed.

A particular advantage resides in the fact that the measurements provide information regarding the chemical reactions that take place and molecular ion formations since, in the mass spectra provided by the apparatus of the invention, there also appear the other elements directly involved in the reaction. Thus, for example, in reactions involving oxygen ($O_2$), initially present in molecular form, the oxygen atom (O) directly involved in the reaction, is also detected through the ($O+-$) signal component. By the detection of ions it is also possible, for the purpose of particle analysis, to detect unstable products formed in the plasma and condensable particles such as solid body material, for example. Finally, a plasma process can be controlled manually or automatically with the aid of the results obtained.

The form and arrangement of the ion-optical apparatus must be so selected that, on the one hand, ionized particles of the plasma can enter the ion-optical means in a reliable manner, while on the other hand, the plasma itself is thereby damaged or interfered with as little as possible. If, in the known manner for example, the plasma is maintained between two electrodes, it has thus been found expedient to arrange the axis of the ion-optical means approximately at right angles to a line interconnecting the two electrodes. The same applies as regards systems having more than two electrodes.

Suitably, the ion-optical means is arranged within a housing which has an inlet opening directed towards the plasma. This prevents the potential associated with the ion-optical means from damaging the plasma to any large extent. If the inlet opening is disposed in immediate proximity to the boundary of the plasma, then it is generally not necessary to provide an accelerating voltage in the ion-optical means. A sufficient quantity of ions will pass into the ion-optical means simply because of the presence of the plasma potential, and those ions will then be recorded by the downstream mass spectrometer.

Since many plasma processes are carried out at relatively high pressures (approximately $10^{-1}$ mbars), it is advantageous if the inlet opening formed in the housing for the ion-optical means and presented to the plasma is so small that it forms a pressure drop stage. Then, the pressure of approximately $10^{-5}$ mbars, necessary for operating the mass spectrometer, can be maintained in the housing for the ion-optical means and in the connected housing for the mass spectrometer. The diameter of the opening is 0.1 to 0.5 mm, for example, at these given pressures.

BRIEF DESCRIPTION OF THE DRAWING

The sole FIGURE is a partly cross-sectional, partly schematic view of one preferred embodiment of apparatus according to the invention.

DESCRIPTION OF THE PREFERRED EMBODIMENTS

By way of example, the FIGURE shows a sputtering system 1 (planar diode arrangement), in which a plasma 4 is established between electrodes 2 and 3. A power supply unit 5 establishes the requisite potential between electrodes 2 and 3. The apparatus in accordance with the invention is arranged laterally of the region containing plasma 4 and is composed of a mass spectrometer 6, which consists of a quadrupole mass analyzer, or filter, 7 and a secondary electron multiplier 8, arranged in a housing 9 (for example disclosed in U.S. Pat. No. 3,757,115). Upstream of the quadrupole mass analyzer 7 is an ion-optical system which consists of three cylinders 10, 11 and 12 aligned with one another along a common longitudinal axis 14. Ion-optical systems of this kind are known in many forms. An example of one system that can be used in the context of this invention is described in U.S. Pat. No. 3,859,226. An ion-optical system of this kind can be made sufficiently small to reduce damage to, or interference with, the plasma 4 as far as possible.

The ion-optical system itself is likewise accommodated in a suitably small housing 15 which is flanged on to the housing 9 and has an inlet opening 16 in its front end face, which opening is presented to the plasma 4 and is coaxial with the cylindrical portions 10, 11 and 12. The front portion of the housing 15 that is directed towards the plasma 4 is held on the remaining part of that housing by way of an insulating piece 17 so that, if required, an accelerating voltage can be applied to the front portion of the housing 15. The front end face of the preferably cylindrical housing 15 should be as small as possible and preferably has a diameter less than 25% of the distance between the electrodes 2 and 3, so that the plasma itself is interfered with as little as possible by the housing portion located in its immediate vicinity or penetrating into it.

Because of the plasma potential, sufficient numbers of ions of the plasma normally pass into the zone of the opening 16, where they enter the housing 15 and are focussed on to the inlet opening of the mass analyzer 7 by the ion-optical means 10, 11 and 12. If the plasma is of low density, or if only a small percentage of the accumulation of gas that is to be observed is ionized, an acceleration voltage can also be applied to the forward portion.

The mass analyzer 7 can be penetrated only by ions having a predetermined mass to charge ratio value, which value can be varied. The mass values can be sampled both automatically, by a mass traverse or scan, and manually, as well as by means of an external control arrangement. The ions are detected by means of the secondary electron multiplier 8. Following electronic amplification of the output of multiplier 8 in an amplifier 19, the resulting signal can be recorded as the mass spectrum of the plasma ions in a recording device 20.

It is also possible to control the cathodic atomization installation in dependence upon the signal delivered by the amplifier 19. In the example illustrated, there is provided, for this purpose, suitable control or regulating means 21, shown simply in block form, connected by a line 22 to the amplifier 19 and exerting a control effect on the power supply unit 5 (e.g. control of discharge circuit and/or the applied voltage) of the cathodic atomization installation 1. Not only could the cathodic atomization installation 1 be, for example, switched off in dependence upon a particular signal, but it is also possible, for example, to regulate the power supplied to the electrodes and/or to regulate the gas mixture for the gas discharge by way of a gas-inlet system 23 (for example, an electrically controlled valve).

The apparatus described can be used in all situations where ionized particles occur irrespective of how they are produced. The use of the described apparatus is also largely independent of the pressure of the prevailing cloud of gas containing ionized constituents. It is only necessary to make certain that the pressure drop present in the zone of the inlet opening 16 is sufficiently great to enable an adequately low pressure for operating the mass spectrometer to be maintained in the housing 9 by means of vacuum pumps, not illustrated.

It will be understood that the above description of the present invention is susceptible to various modifications, changes and adaptations, and the same are intended to be comprehended within the meaning and range of equivalents of the appended claims.

What is claimed is:

1. Apparatus for monitoring a plasma process in which a plasma is formed to occupy a specified region between two electrodes spaced a predetermined distance from each other, said apparatus comprising, in combination:

mass spectrometer means including a mass analyzer having an ion inlet and an ion outlet and an ion detector disposed in operative association with said ion outlet;

output means connected to said detector for providing an output signal representative of the mass spectrum of ions observed by said mass spectrometer means;

ion-optical means oriented approximately at right angles to a line interconnecting the two electrodes, having an inlet opening located in the vicinity of the specified region and disposed for extracting ions from the plasma and focussing the ions thus extracted onto said ion inlet of said analyzer; and a housing carrying said ion-optical means and having an open rear end facing said spectrometer means and a front end directed toward the specified region and provided with said inlet opening, wherein said housing is cylindrical and has a diameter which is less than one-fourth the distance between said electrodes.

2. Apparatus as defined in claim 1 wherein said housing comprises a rear part extending from said rear end and a front part extending from said front end and electrically insulated from said rear part.

3. Apparatus as defined in claim 1 or 4 wherein said inlet opening is dimensioned to produce a pressure drop between the specified region and the interior of said housing.

4. Apparatus as defined in claim 1 further comprising process control means connected for receiving the output signal produced by said output means and for controlling the plasma process as a function of that signal.

* * * * *